Nov. 11, 1958  E. F. W. MOELTZNER  2,859,646
FEEDING AND DISCHARGING MECHANISM FOR ROLL FORMING MACHINES
Filed June 8, 1954

INVENTOR
ERNST FRITZ WILHELM MOELTZNER

BY Strauch, Nolan & Diggins

ATTORNEYS

United States Patent Office 2,859,646
Patented Nov. 11, 1958

2,859,646

FEEDING AND DISCHARGING MECHANISM FOR ROLL FORMING MACHINES

Ernst Fritz Wilhelm Moeltzner, Berlin-Charlottenburg, Germany, assignor, by mesne assignments, to Landis Machine Company, Waynesboro, Pa., a corporation of Pennsylvania Application June 8, 1954, Serial No. 435,281

Claims priority, application Germany August 13, 1953

3 Claims. (Cl. 80—6)

The invention concerns a mechanism for feeding and discharging work pieces in machine tools having rolling tools, especially thread rolling machines, said machine tools having one or more pairs of rolls driven in the same direction of rotation by operating shafts and having transfer means mounted on one operating shaft and rotated through friction means, said transfer means having recesses on the circumference thereof for the work pieces which are to be fed from a magazine to the rolling tools.

Such rotating transfer mechanisms having recesses for receiving work pieces to be fed are known in the form of cylinders which pass through the space between the rolling tools and are caused to rotate by the drive means of an operating shaft, via friction means. The work pieces are thereby forced in succession through the rolling space between two rolling tools which are positioned opposite each other at a fixed distance apart. In this mechanism the cylinder provided with recesses undertakes only to guide the work pieces. However, this rolling process does not produce precision threads nor does it permit a large amount of cold-forming. Rather, it is necessary, for this purpose, to move the rolling surfaces towards each other so that the profile form of the rolling tools gradually penetrates into the material of the work piece, which lies with its axis in the plane passing through the axes of the rolling tools. For this purpose the work piece is placed upon a work rest blade of fixed height arranged between the rolling tools, said height being adapted to the work diameter. In order to feed work pieces to a work rest blade, it has previously been proposed to form one of the rolling tools itself as a feeding means. However, to do this requires special rolls which are provided with recesses on their circumferences to receive the work pieces and which are furthermore formed with a spiral circumferential surface. The disadvantage of this mechanism resides in the fact that the work piece, when it arrives in the recess in the rolling tool from the feed chute leading from the magazine, must pass through a transfer path of about three-fourths of the circumferential length in order to reach the work rest blade. The output of the machine is thereby unnecessarily reduced. It has accordingly been proposed previously to use the above-mentioned feeding cylinder provided with recesses, as a work rest blade and to lock it in each working position. However, this device requires extensive control mechanism and is relatively complex. Furthermore, the locking means is subject to wear so that the work piece no longer comes to rest accurately in the plane of the axes for the forming operation.

It is the object of the invention to accomplish the fully automatic feeding of work pieces by means of a rotating feeding cylinder which guarantess, with the simplest means, a rapid and exact feeding of work pieces and an accurate working position and furthermore effects the removal of finish-rolled work pieces. This is achieved, according to the invention, by a combination of the feeding cylinder provided with recesses and a work rest blade disposed between the rolls. In accordance with the invention this is effected by the fact that one or more transfer discs having recesses for the work pieces pass by one or more stationary work rest blades mounted between the rolls, said transfer discs rotating in a direction from the magazine to the supporting surface of the work rest blade and said transfer discs being arrested by the work piece lying on the work rest blade until the work piece leaves the blade, whereupon a new work blank is fed by the further rotation of the transfer discs. A preferable embodiment of the invention resides in the fact that the recesses in the transfer discs have inclined surfaces which press from above upon the work piece lying on the blade, said inclined surfaces, through the friction means, exerting a constant lateral pressure upon the work piece to eject the same, said pressure being directed towards the counter roll.

The essential advantage of this mechanism resides in increased simplicity and accuracy and a substantial reduction in the price of the automatic feeding mechanism. The feeding cylinder operated by locking means is eliminated. The work rest blade, whose height remains unchanged for a particular work piece, is constantly at the same place and makes it possible to use a simple carbide tip on the work supporting surface. A further advantage resides in the fact that the finish-rolled work piece is positively discharged by the lateral pressure exerted by the inclined surface and is discharged at a speed greater than that induced by gravity. Nevertheless, the entire rolling time is available for the new blank to fall from the feed chute into the recess in the transfer disc.

The opposite or counter roll can be used to discharge the work piece so that the further rotation of the transfer discs is controlled by a counter roll which is provided in per se known manner with one or more recesses on its circumference to receive the work piece and is also provided with spirally rising circumferential surfaces. It is also possible, however, to effect the further rotation of the transfer discs in accordance with the per se known separating movement of cylindrical rolling tools, wherein a conveyor belt is mounted laterally of the work rest blade to carry away the discharged work pieces.

A preferable embodiment of the invention resides in the fact that the transfer discs are disposed at the inward sides of two rolling tools mounted spaced apart on the drive shaft, in order to roll studs or other work pieces having threads on both ends by means of two simultaneous rolling operations and to be able to feed the work pieces to the working position. However, it is also possible to use only one transfer disc which has a width great enough to carry a work piece by engaging it centrally or at one side.

If a rolling tool provided with spirally rising circumferential surfaces and one or more recesses arranged on the circumference is used as a counter roll for discharging the work piece, then in accordance with the invention, this tool has, on the side of the recess opposite to the inclined surface, a blank space extending in a direction opposite to the direction of rotation. The angular extent of this blank space is at least equal to or somewhat greater than that of the recesses in the transfer disc. Trouble-free cooperation between the transfer disc and the counter roll is guaranteed by this special construction of the counter roll. During the rolling operation the transfer disc is in a rest position which is dependent upon the locking by means of the work piece, so that it is not rotated with immediate full speed. The finish-rolled work piece must first enter the recess in the counter roll before the new work piece can be fed to the work rest blade by the resumed rotation of the transfer disc. The time in which this occurs must extend to the beginning of the rolling operation of the new work piece. The blank space on the counter roll assures unhindered feeding of the new work piece in synchronism with the rotational speed of the transfer disc and counter roll.

The subject matter of the invention is illustrated in a thread rolling machine by way of example. In the drawing.

Figure 1:
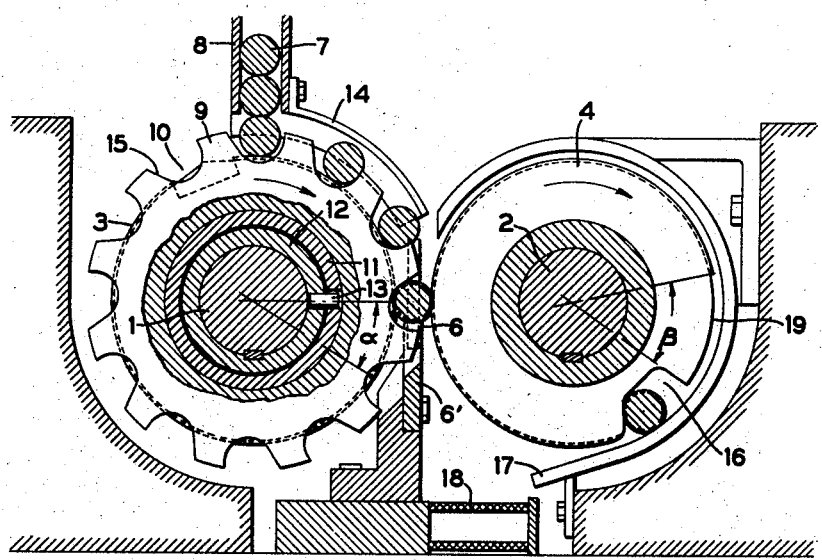
Figure 1 shows the feeding mechanism in elevation.
Figure 2:
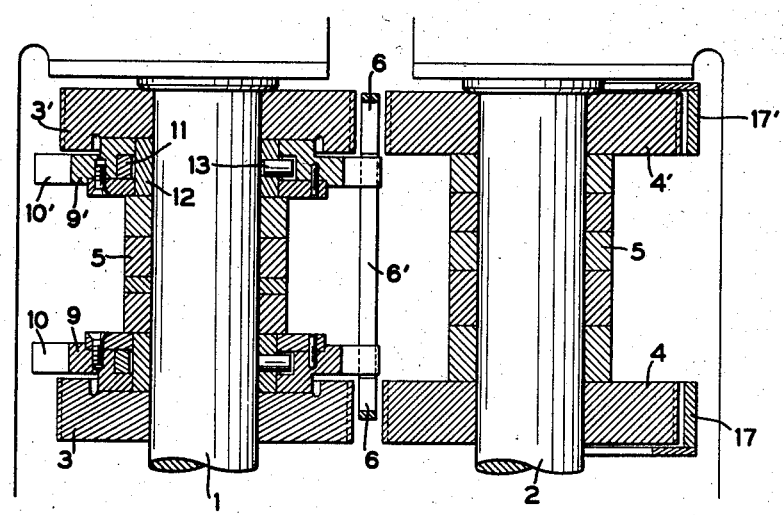
Figure 2 is a plan view of the feeding mechanism of Figure 1 with two spaced rolling tools mounted on each drive shaft and one work rest blade having a central cut-away portion.

The drive shafts of the thread rolling machine are designated by 1 and 2. The left hand drive shaft 1 carries the two rolling tools 3 and 3'. The right hand drive shaft 2 carries the rolling tools 4 and 4'. The distance between the rolls is determined by the spacing rings 5. The stationary work rest blade 6 is disposed between the rolls. The work pieces 7 are fed from a magazine (not shown) through the vertical feed chute 8 to the transfer discs 9 and 9' which have a plurality of contiguous recesses 10 and 10', respectively, to receive the work pieces. In the exemplary embodiment shown, 12 such recesses are arranged on the circumferences of each transfer disc so that the angular distance between adjacent recesses amounts to 30°. Each transfer disc is driven by a friction drive which, in the embodiment shown, comprises a split friction ring 11 disposed within the transfer disc. The rotational movement of the drive shaft 1 is transmitted to the friction ring 11 through the drive ring 12 and the pin 13. Both friction rings have the same drive mechanism. Both drive shafts rotate in the same direction, as indicated by the arrows, and this direction is such that the work pieces are fed from the feed chute of the magazine and arrive upon the work rest surface of the blade from above. As soon as a work piece is deposited upon the work rest blade, it prevents further rotation of the transfer discs and simultaneously aligns them relative to each other. The feed chute 8 is connected to a cover 14 of arcuate form which prevents the work pieces from falling out of the recesses 10. Each of the recesses 10 is provided with an inclined surface 15, which presses down from above upon the work piece lying on the work rest blade under influence of the friction drive. The sides of the recesses opposite to the inclined surfaces are directed substantially radially.

Each of the counter rolls 4 and 4' has a recess 16 on its circumference to receive and discharge the work piece. Each of the rolls is surrounded by a guide plate 17 and 17' which leads the finish-rolled work pieces to the conveyor belt 18 arranged beneath the rolls. The work pieces are carried by this belt into a container. Each of the counter rolls has on its circumference a blank space 19 whose angular extent is designated β. For reasons previously stated, the angular distance β is at least equal to or slightly greater than the angular distance α between two recesses in the transfer discs.

When in working position, the work piece lies on the work rest blade only between the rolls, the blade having for this reason a central stepped portion 6', lower than the two ends of the blade. Two detached blades may also be used. The construction of the blade is determined in each case by the arrangement of the rolls, so the embodiment shown is to be regarded only as an example. Thus it is possible for example, to undertake three rolling operation simultaneously on one working piece. The rolling operations are not limited to thread rolling. Thus it is also possible to serrate, knurl or to impress letters. It is also possible to graduate a portion of the work piece. The cylindrical tools can also be used on centerless grinding machines. The feeding mechanism described can serve all of these purposes.

The manner of operation is as follows:

The work pieces fall successively into the upright, vacant recesses 10 of the transfer disc or discs, which rotate clockwise toward the supporting surface of the work rest blade. If it is assumed that the work pieces, as shown in Figure 1, occupy the recesses as far as the work rest blade, the drive of the transfer discs, effected through the friction device, is arrested until the work piece lying on the blade is pushed into the recess 16 of the counter roll, the work piece on the blade being under the constant lateral pressure of the inclined surface 15. The finished work piece is then discharged by these counter rolls as illustrated in Figure 1. Meanwhile, the transfer discs have rotated a further amount so that the next following work piece arrives upon the work rest blade. Thereupon the process repeats.

I claim:

1. Mechanism for roll forming work pieces comprising a pair of driven rotatable forming rolls mounted to form a rolling station between their adjacent peripheral portions, means to rotate said rolls, one of said rolls being substantially cylindrical and the other of said rolls having its periphery interrupted by at least one work piece receiving recess, a work rest positioned adjacent said rolling station, a transfer member mounted for rotation coaxially of said cylindrical roll, said member having peripheral work receiving notches adapted to carry a work piece from a feeding magazine to said work rest, means for frictionally driving said transfer member, the rotation of said member being arrested by the work piece contacting said work rest to permit the roll forming thereof, means on said transfer member to force said work piece into said work piece receiving recess in said other roll so that said other roll may carry it away from said work rest while rotating and said transfer means is thereby allowed to rotate the next work piece into contact with said work rest by virtue of said frictional drive, said other roll having a blank space on its periphery extending in a direction opposite to the direction of rotation, the angular extent of said blank space being at least equal to the distance between adjacent notches on said transfer member.

2. Mechanism for roll forming work pieces comprising a pair of forming rolls mounted to form a rolling station between their adjacent peripheral portions, one of said rolls being substantially cylindrical and the other of said rolls having its periphery interrupted by at least one work piece receiving recess, a work rest positioned adjacent said rolling station, a transfer member mounted for rotation coaxially of the cylindrical roll, said member having peripheral work receiving notches adapted to carry a work piece from a feeding magazine to said work rest, means for frictionally driving said transfer member, the rotation of said member being arrested by the work piece contacting the work rest, said notches in said transfer member being arranged to impose a radially outwardly directed pressure on said work piece, and means for rotating said forming rolls to periodically dispose said work piece receiving recess in said other roll opposite said work rest, whereby said notches force said work piece into said work receiving recess and said member rotates by virtue of the frictional drive to deliver the succeeding work piece to said work rest.

3. Mechanism for roll forming work pieces comprising a pair of forming rolls, one of said rolls having at least one work piece receiving recess, means for rotating said rolls, a relatively fixed work rest positioned adjacent a rolling station between adjacent peripheral portions of said rolls, a transfer member mounted for rotation coaxially with the other of said rolls, said member having peripheral work piece receiving notches adapted to carry the work piece from a feeding magazine to said work rest, said notches having inclined surfaces, and means for constantly, frictionally driving said transfer member in a direction to move said notches from said feeding magazine toward said work rest, the rotation of said transfer member being arrested by the work piece contacting the work rest and the inclined surfaces of said notches exerting a radially outwardly directed pressure on the work piece to eject the same from the work rest into said work piece receiving recess in said one roll whereupon a new work piece is fed by the further rotation of the transfer member.

References Cited in the file of this patent

UNITED STATES PATENTS

| | | |
|---|---|---|
| 917,269 | Eden | Apr. 6, 1909 |
| 1,107,621 | Landis | Aug. 18, 1914 |
| 2,342,817 | Plagemann | Feb. 29, 1944 |
| 2,632,345 | Hopkins | Mar. 24, 1953 |

FOREIGN PATENTS

| | | |
|---|---|---|
| 495,407 | Belgium | Aug. 16, 1950 |
| 692,168 | Great Britain | May 27, 1953 |
| 837,088 | Germany | Apr. 21, 1952 |